United States Patent
Beggs et al.

(10) Patent No.: US 10,467,833 B1
(45) Date of Patent: Nov. 5, 2019

(54) INTEGRATED PROPERTY SERVICE MANAGEMENT SYSTEM

(71) Applicants: Ashlee Beggs, Mountain View, CA (US); Greg Victor Bertoldo, Mountain View, CA (US); Jacob N. Huffman, Oakland, CA (US)

(72) Inventors: Ashlee Beggs, Mountain View, CA (US); Greg Victor Bertoldo, Mountain View, CA (US); Jacob N. Huffman, Oakland, CA (US)

( * ) Notice: Subject to any disclaimer, the term of this patent is extended or adjusted under 35 U.S.C. 154(b) by 855 days.

(21) Appl. No.: 15/088,040

(22) Filed: Mar. 31, 2016

(51) Int. Cl.
| | |
|---|---|
| *G07C 9/00* | (2006.01) |
| *H04W 4/04* | (2009.01) |
| *G06Q 20/10* | (2012.01) |
| *G06Q 20/40* | (2012.01) |
| *G06F 16/23* | (2019.01) |

(52) U.S. Cl.
CPC ...... *G07C 9/00119* (2013.01); *G06F 16/2358* (2019.01); *G06Q 20/10* (2013.01); *G06Q 20/405* (2013.01); *H04W 4/043* (2013.01)

(58) Field of Classification Search
None
See application file for complete search history.

(56) References Cited

U.S. PATENT DOCUMENTS

| | | | | |
|---|---|---|---|---|
| 2009/0326991 | A1* | 12/2009 | Wei | G06Q 10/02 705/5 |
| 2015/0161643 | A1* | 6/2015 | Randell | H04W 4/21 705/14.26 |

OTHER PUBLICATIONS

"August Smart Lock", http://www.august.com, Jan. 1, 2013, 6 pages.

* cited by examiner

*Primary Examiner* — Scott S Trotter
(74) *Attorney, Agent, or Firm* — Ferguson Braswell Fraser Kubasta PC

(57) ABSTRACT

A system including a location tracking device, a security device, and a computer processor and memory. The memory stores instructions that, when executed, cause the computer processor to perform the steps of obtaining a pre-determined service subscription record identifying a service provider carrying the location tracking device for performing a pre-determined service at a pre-determined location and at a pre-determined time, receiving an identifier transmitted by the location tracking device to detect an arrival of the location tracking device to the pre-determined location, obtaining, in response to detecting the arrival, a timestamp representing when the location tracking device arrives at the pre-determined location, generating, in response to detecting the arrival, a match by comparing the identifier and the timestamp to the pre-determined service subscription record, and deactivating, in response to generating the match and detecting the arrival, the security device to allow the service provider entering the pre-determined location.

21 Claims, 8 Drawing Sheets

Kara's Screenshot A
360a

Craig's Screenshot F
360

Kara's Screenshot B
370a

Craig's Screenshot G
370

Kara's Screenshot C
380a

Craig's Screenshot H
380

Kara's Screenshot D
390a

Kara's Screenshot E
390b

US 10,467,833 B1

INTEGRATED PROPERTY SERVICE MANAGEMENT SYSTEM

BACKGROUND

People subscribe various services provided to their residences or offices, such as cleaning service, gardening service, child care service, dog walking service, etc. A service recipient often needs to be present to provide access to the service location, tracking time spent by the service provider, and/or to pay for the service. Otherwise, the service recipient may not be sure whether the service provider indeed visited the service location to provide the subscribed service.

SUMMARY

In general, in one aspect, the invention relates to a system that includes a location tracking device carried by a service provider, a security device for controlling access to a pre-determined location, and a first computer processor and memory storing instructions that, when executed, cause the first computer processor to perform the steps of (i) obtaining a pre-determined service subscription record identifying the service provider carrying the location tracking device for performing a pre-determined service at the pre-determined location and at a pre-determined time, (ii) receiving an identifier transmitted by the location tracking device to detect an arrival of the location tracking device to the pre-determined location, (iii) obtaining, in response to detecting the arrival, a first timestamp representing when the location tracking device arrives at the pre-determined location, (iv) generating, in response to detecting the arrival, a match by comparing the identifier and the first timestamp to the pre-determined service subscription record, and (v) deactivating, in response to generating the match and detecting the arrival, the security device to allow the service provider entering the pre-determined location.

In general, in one aspect, the invention relates to a method of using a location tracking device. The method includes obtaining a pre-determined service subscription record identifying a service provider carrying the location tracking device for performing a pre-determined service at a pre-determined location and at a pre-determined time, receiving an identifier transmitted by the location tracking device to detect an arrival of the location tracking device to the pre-determined location, obtaining, in response to detecting the arrival, a first timestamp representing when the location tracking device arrives at the pre-determined location, generating, in response to detecting the arrival, a match by comparing the identifier and the first timestamp to the pre-determined service subscription record, detecting, subsequent to generating the match and based on the identifier transmitted by the location tracking device, a departure of the location tracking device from the pre-determined location, obtaining, in response to detecting the departure, a second timestamp representing when the location tracking device departs from the location, and generating a service completion record based on the first timestamp and the second timestamp.

In general, in one aspect, the invention relates to a non-transitory computer readable medium storing instructions for using a location tracking device. The instructions, when executed by a computer processor, includes functionality for obtaining a pre-determined service subscription record identifying a service provider carrying the location tracking device for performing a pre-determined service at a pre-determined location and at a pre-determined time, receiving an identifier transmitted by the location tracking device to detect an arrival of the location tracking device to the pre-determined location, obtaining, in response to detecting the arrival, a first timestamp representing when the location tracking device arrives at the pre-determined location, generating, in response to detecting the arrival, a match by comparing the identifier and the first timestamp to the pre-determined service subscription record, detecting, subsequent to generating the match and based on the identifier transmitted by the location tracking device, a departure of the location tracking device from the pre-determined location, obtaining, in response to detecting the departure, a second timestamp representing when the location tracking device departs from the location, and generating a service completion record based on the first timestamp and the second timestamp.

Other aspects of the invention will be apparent from the following transaction description and the appended claims.

DETAILED DESCRIPTION

Figure 1:
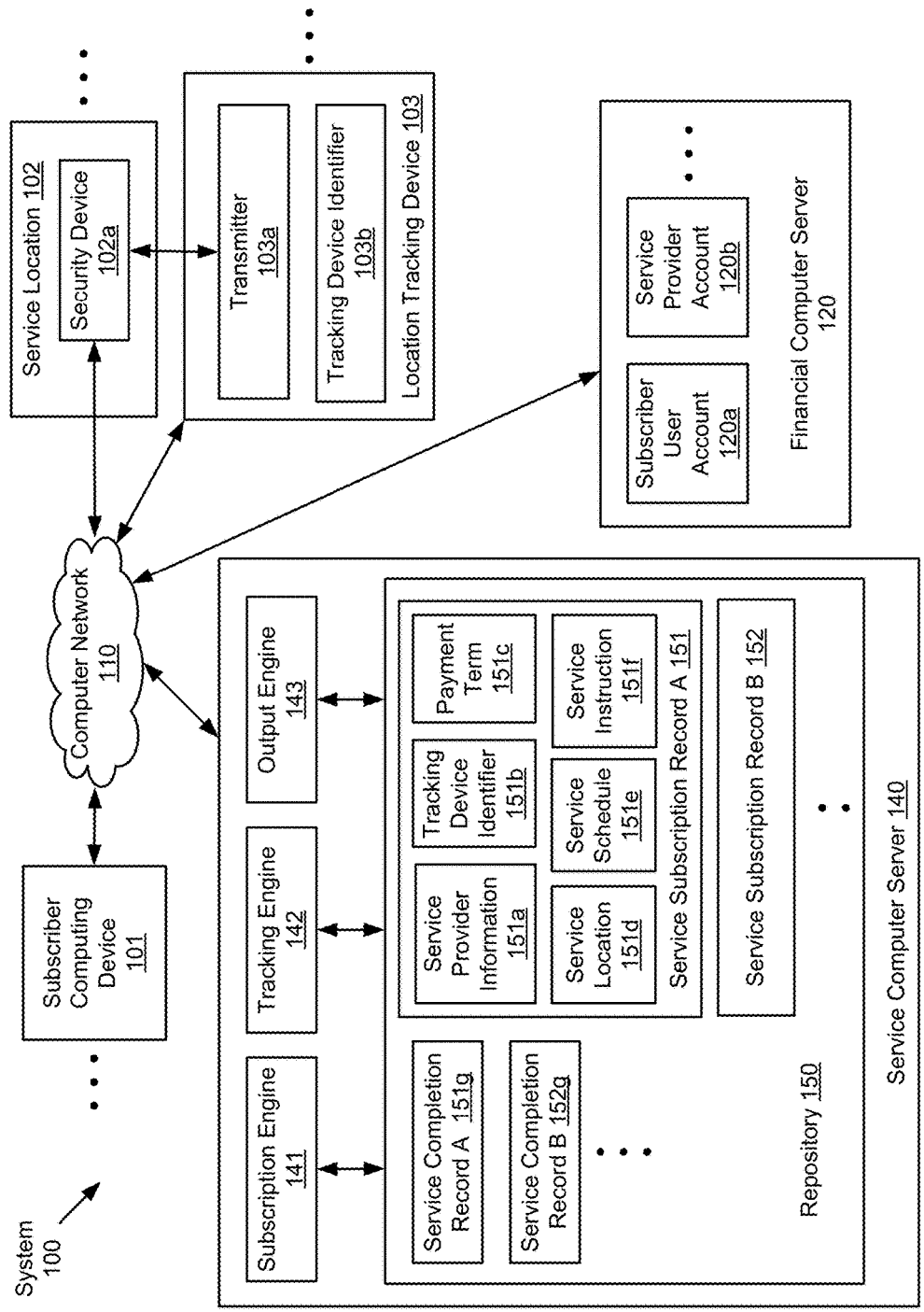
FIG. 1 shows a block diagram of a system in accordance with one or more embodiments of the invention.

Specific embodiments of the invention will now be described in detail with reference to the accompanying figures. Like elements in the various figures are denoted by like reference numerals for consistency. Further, in the figures, three collinear dots mean that more elements of the same type as before the three collinear dots may optionally exist in accordance with one or more embodiments of the invention.

In the following detailed transaction description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the transaction description.

In general, embodiments of the invention provide a system, method, and computer readable medium to automatically recognize an authorized service provider at a service location (e.g., house, apartment, permanent residence, office, factory, warehouse, etc.), provide temporary entry to the service location for the service provider, and pay the service provider for time spent and/or service provided upon departure of the service provider. In one or more embodiments of the invention, an integrated system provide the authentication, entry control, time recording, and autonomous payments.

FIG. 1 shows a block diagram of a system (100) in accordance with one or more embodiments of the invention. Specifically, the system (100) includes subscriber computing devices (e.g., subscriber computing device (101), etc.) used by subscriber users (not shown), physical locations (e.g., service location (102), etc.) where services are provided, location tracking devices (e.g., location tracking device (103), etc.) carried by service providers (not shown), a service computer server (140), and a financial computer server (120) that are coupled via a computer network (110). The service computer server (140) includes a subscription engine (141), a tracking engine (142), an output engine (143), and a repository (150). In one or more embodiments of the invention, the computer network (110) may include a cellular phone network, a wide area network, a local area network, a public switched telephone network (PSTN), a financial network, any other suitable network that facilitates the exchange of information from one part of the network to another, or a combination thereof. In one or more embodiments, the computer network (110) is coupled to or overlaps with the Internet. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

In one or more embodiments of the invention, the subscriber computing device (101) is a computing and/or communication device having computing and data communication capabilities. For example, the subscriber computing device (101) may include a smart watch, a smartphone, a tablet computer, a notebook computer, etc. that is used by a subscriber user. In particular, the subscriber computing device (101) includes a user interface (e.g., a display with touch input capability, a voice input/output device, etc.) for the subscriber user to interact with the service computer server (140).

In one or more embodiments, the subscriber computing device (101) is configured to send a request, to the service computer server (140), to track a service provider for performing a pre-determined service (e.g., cleaning service, gardening service, child care service, dog walking service, etc.) at the service location (102). For example, the service location (102) may be an residence or business location (e.g., house, apartment, permanent residence, office, factory, warehouse, etc.) owned, operated, used, or otherwise controlled by the subscriber user. The service provider is a person or a group of persons performing the service at the service location (102) for the subscriber user. In this context, the subscriber user is a service recipient, i.e., a person or a group of persons receiving the service from the service provider.

In one or more embodiments, the subscriber computing device (101) is configured to receive, from the service computer server (140), a message (referred to as a subscriber message) notifying the subscriber user regarding status of the service performed by the service provider. For example, the message may indicate the arrival, departure, and/or elapse time of the service provider at the service location (102). In one or more embodiments, the service location (102) includes a security device (102a) for controlling access to the service location (102). For example, the security device (102a) may include a remote-controlled lock that is unlocked (i.e., deactivated) and/or locked (i.e., activated) in response to a command from the service computer server (140).

In one or more embodiments of the invention, the location tracking device (103) is a computing and/or communication device having computing and data communication capabilities. For example, the location tracking device (103) may include a global positioning service (GPS) device, a smart watch, a smartphone, a tablet computer, a notebook computer, or other wearable/portable computing/communication devices carried by a service provider. In one or more embodiments, the location tracking device (103) includes a transmitter (103a) that is a hardware circuit configured to transmit location information of the location tracking device (103). Throughout this disclosure, the location information refers to a data item that uniquely identifies where a location tracking device is located at the time of transmitting the location information. For example, the location information of the location tracking device (103) may be transmitted, at least in part via the computer network (110), directly to the service computer server (140). In another example, the location information of the location tracking device (103) may be obtained, at least in part via the computer network (110), indirectly by the service computer server (140). In one or more embodiments, the location tracking device (103) includes a tracking device identifier (103b) that identifies the location tracking device (103) among multiple location tracking devices that are tracked by the service computer server (140). For example, the tracking device identifier (103b) may include a phone number, an electronic serial number (ESN), a media access control (MAC) address etc. In one or more embodiments, the location information of the location tracking device (103) and the tracking device identifier (103b) are transmitted together, directly or indirectly, to the service computer server (140). In one or more embodiments, the location tracking device (103) is further configured to receive a message (referred to as a service provider message) from the service computer server (140). For example, the message may include a service instruction identifying aspects of the service to be performed at the service location (102), such as a method step, a service sequence, a priority, a preference, etc. specific to the service location (102). In another example, the message may include a confirmation of a payment subsequent to service completion at the service location (102). In one or more embodiments, the location tracking device (103) includes a user interface (e.g., a display, a voice output device, etc.) for presenting the service provider message to the service provider.

In one or more embodiments of the invention, the financial computer server (120) is a networked computing server used by financial institutions (e.g., a bank) to maintain financial accounts of the subscriber users and service providers. For example, the subscriber user account (120a) may be a bank account belonging to the subscriber user associated with the subscriber computing device (101). The service provider account (120b) may be a bank account belonging to the service provider carrying the location tracking device (103). In one or more embodiments, the financial computer server (120) is configured to complete a payment by the subscriber user to the service provider by transferring a payment amount from the subscriber user account (120a) to the service provider account (120b). For example, the payment may be initiated by the service computer server (140) as a result of tracking the service performed at the service location (102) by the service provider for the subscriber user. Various components of the service computer server (140) for tracking the services are described in detail below.

In one or more embodiments of the invention, the repository (150) may include a disk drive storage device, a semiconductor storage device, a database management system, other suitable computer data storage devices, or combinations thereof. In one or more embodiments, content stored in the repository (150) may be a data file, a linked list, a data sequence, a database, a graphical representation, or any other suitable data structure. In one or more embodiments of the invention, the repository (150) includes functionality to store data used and/or generated by the subscription engine (141), tracking engine (142), and output engine (143) of the service computer server (140). The data stored in the repository (150) includes service subscription records (e.g., service subscription record A (151), service subscription record B (152), etc.) and service completion records (e.g., service completion record A (151g), service completion record B (152g), etc.) that are generated and used by the service computer server (140).

In one or more embodiments of the invention, the service subscription record A (151) describes the service tracking requested by the subscriber user using the subscriber computing device (101). In particular, the service subscription record A (151) includes the service provider information (151a), tracking device identifier (151b), payment term (151c), service location (151d), service schedule (151e), and service instruction (151f) that are provided by the subscriber user. In one or more embodiments, the service subscription record A (151) is obtained from the subscriber computing device (101) when the subscriber user requests tracking the service provider for performing a pre-determined service (e.g., cleaning service, gardening service, child care service, dog walking service, etc.) at the service location (102). The service provider information (151a) describes the service provider and may include one or more of a name, phone number, address, and/or other contact information of the service provider.

The tracking device identifier (151b) identifies the location tracking device (103) carried by the service provider. In one or more embodiments, the tracking device identifier (151b) is included in the service provider information (151a) and is provided directly by the subscriber user using the subscriber computing device (101). In one or more embodiments, the tracking device identifier (151b) is retrieved from a service provider database using the service provider information (151a) provided by the subscriber user. For example, the service provider may have previously registered the tracking device identifier (151b) in the service provider database. The payment term (151c) describes the condition for paying for the service as agreed upon by the subscriber user and the service provider. For example the payment term (151c) may specify an hourly rate of the service, a flat payment amount of the service, or other additional terms and conditions of the service payment. The service location (151d), service schedule (151e), and service instruction (151f) describe where, when, and how the service is to be performed.

In one or more embodiments of the invention, the service completion record A (151g) indicates a completion status of a scheduled service visit to the service location (102). For example, the service completion record A (151g) may be linked to the service subscription record A (151) and include a completion timestamp of the scheduled service visit to the service location (102). In another example, the service completion record A (151g) may include multiple completion timestamps corresponding to a recurring schedule of service visits.

In one or more embodiments of the invention, the service subscription record B (152) and the service completion record B (152g) correspond to another subscriber user, another service location, and/or another service provider that are different from the subscriber user, service location, and/or service provider associated with the service subscription record A (151) and the subscriber user service completion record A (151g). In one example, the service subscription record A (151) and the service subscription record B (152) are associated with different subscriber users. In another example, the service subscription record A (151) and the service subscription record B (152) are associated with different service locations. In yet another example, the service subscription record A (151) and the service subscription record B (152) are associated with different service providers.

In one or more embodiments of the invention, the subscription engine (141) includes software, hardware, or a combination of software and hardware that is configured to generate a service subscription record (e.g., service subscription record A (151), service subscription record B (152), etc.) in response to a request from and based on information provided by a subscriber user using a corresponding subscriber computing device (e.g., subscriber computing device (101)). In one or more embodiments, the subscription engine (141) generates the service subscription records using the method described in reference to FIG. 2 below.

In one or more embodiments of the invention, the tracking engine (142) includes software, hardware, or a combination of software and hardware that is configured to detect service providers' visits at service locations (e.g., service location (102)), deactivating/activating security devices (e.g., security device (102a)) to control service providers' access to the service locations (e.g., service location (102)), and generating service completion records (e.g., service completion record A (151g), service completion record B (152g), etc.) corresponding to the service providers' visits at service locations. In one or more embodiments, the tracking engine (142) performs these tasks using the method described in reference to FIG. 2 below.

In one or more embodiments of the invention, the output engine (143) includes software, hardware, or a combination of software and hardware that is configured to generate service visit related messages (e.g., aforementioned subscriber message and service provider message) and initiate payments to the service providers. In one or more embodiments, the output engine (143) performs these tasks using the method described in reference to FIG. 2 below.

Figure 2:
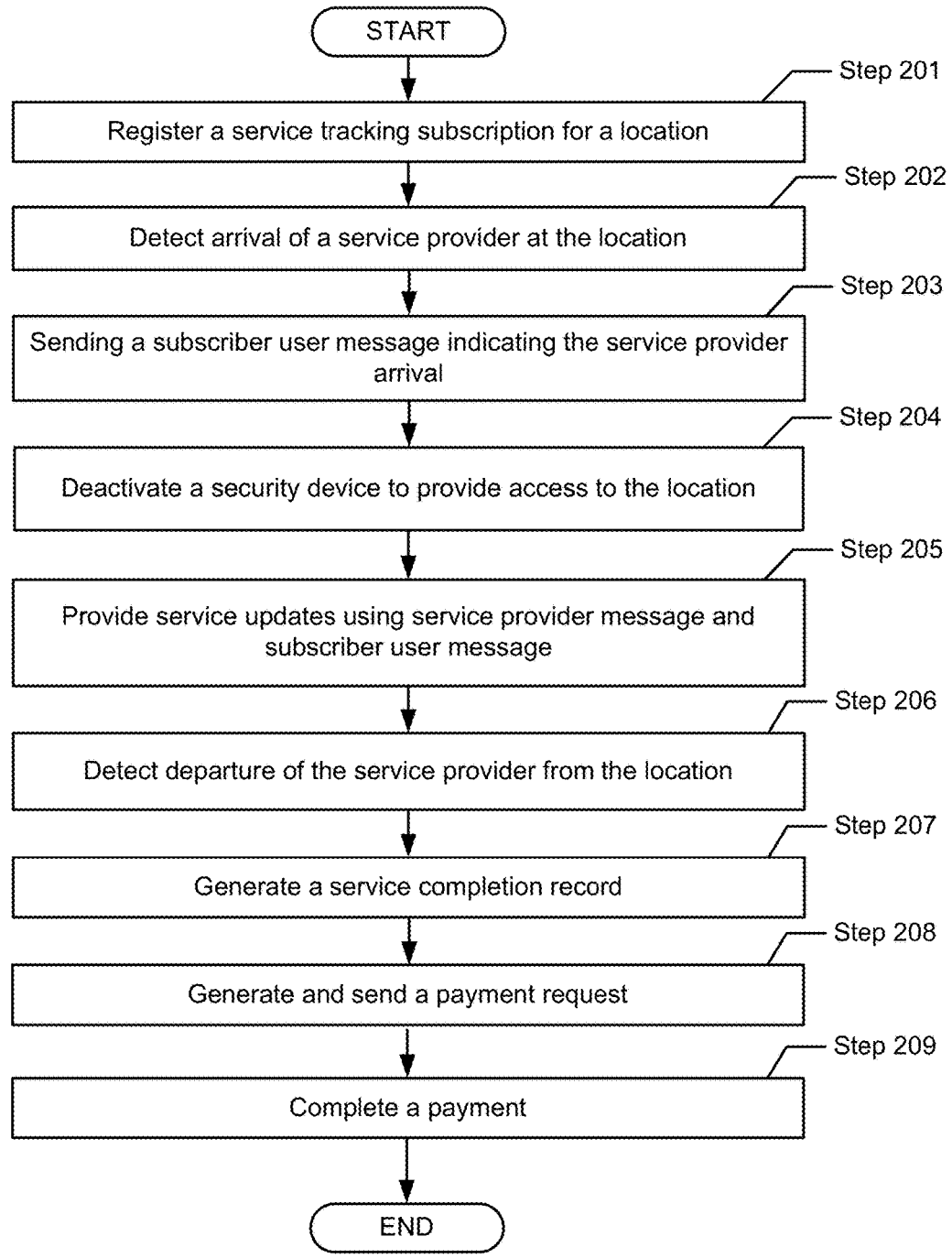
FIG. 2 shows a flowchart in accordance with one or more embodiments of the invention.

FIG. 2 shows a flowchart in accordance with one or more embodiments of the invention. In one or more embodiments of the invention, the method of FIG. 2 may be practiced using the system (100) described in reference to FIG. 1 above. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

Initially, in Step 201, a service tracking subscription is registered for a service location. In one or more embodiments of the invention, the registration is based on a request from a subscriber user to track a service provider for performing a pre-determined service at the service location and at a specified time. In response to the request, a service subscription record is generated and stored by a service computer server for tracking one or more service visits to the service location. Based on the context, the service provider, service location, and service visit specified in the service subscription record may be referred to as a registered service provider, a registered service location, and a registered service visit. In other words, the registered service provider, registered service location, and registered service visit are registered to be tracked by the service computer server.

In one or more embodiments, prior to a scheduled service visit, a service instruction is received that describes a method, a priority, a preference, etc. that is specific to the service location regarding the service visits. For example, the service instruction may describe general instruction applicable to all service visits to the service location. In another example, the service instruction may describe one time only instruction applicable to a particular service visit to the service location.

In Step 202, an arrival of the service provider at the service location is detected. In one or more embodiments of the invention, an identifier and associated location information are transmitted by a location tracking device carried by the service provider. For example, the identifier and associated location information may be transmitted periodically (e.g., every second, every minute, every 10 minutes, hourly, etc.), in response to a trigger (e.g., a request by the service provider, a movement or travelling speed of the location tracking device exceeding a threshold, etc.), or whenever the location tracking device is active (e.g., powered up, logged in, etc.). In one or more embodiments, a large number (e.g., hundreds, thousands, hundred thousands, etc.) of identifiers and associated location information are monitored (e.g., periodically obtained) for multiple location tracking devices and filtered into a subset containing only identifiers found in the service subscription records maintained by the service computer server. Each identifier and associated location information within the subset are then compared to service provider information and location information stored in these service subscription records to identify a match. The match indicates the arrival of a registered location tracking device to a registered service location.

In response to detecting the arrival, an arrival timestamp is obtained that represents when the location tracking device arrives at the service location. Accordingly, the identifier and the arrival timestamp are compared with the service subscription record to determine whether they match a registered service visit. In other words, the identifier and the arrival timestamp are used to determine whether the service provider is indeed scheduled to visit the service location when the location tracking device arrives at the service location as indicated by the detected arrival. In one or more embodiments, when the identifier and the arrival timestamp match a registered service visit in the service subscription record, the service provider is authenticated for the service visit at the service location.

In Step 203, in response to detecting the arrival and authenticating the service provider at the service location, a service subscriber message is sent to a subscriber computing device to notify the subscriber user regarding the service provider arrival for the service visit. In one or more embodiments, a name of the service provider is retrieved from the service subscription record and included in the service subscriber message along with the arrival timestamp.

In Step 204, in response to detecting the arrival and authenticating the service provider at the service location, a security device at the service location is deactivated (e.g., unlocked) to allow the service provider entering the service location. In one or more embodiments, a deactivation signal (e.g., wired or wireless) is sent by the service computer server installed within the service location to the security device to deactivate the security device. In one or more embodiments, a wireless deactivation signal is sent by the service computer server installed at a remote location separate to the security device to deactivate the security device.

In Step 205, service provider messages and subscriber user messages are exchanged to provide updates regarding the service visit. In one or more embodiments, in response to detecting the arrival and authenticating the service provider at the service location, a service provider message is sent to a service provider mobile device used by the service provider. For example, the service provider message may include a previously obtained service instruction to remind the service provider regarding the service procedure, priority, preference, etc., specific to the service location or regarding a last minute special instruction for the current service visit. In another example, a service summary is sent by the service provider using the location tracking device to the service computer server and relayed to the subscriber computing device. The service summary may include the service provider's comment regarding any aspect of the service instruction.

In Step 206, a departure of the location tracking device from the service location is detected. In one or more embodiments, a mismatch is detected by comparing the identifier and the location information transmitted by the location tracking device to the service subscription record. The mismatch that persists over a pre-determined time period (e.g., 5 minutes, 10 minutes, etc.) indicates the departure of the location tracking device and the service provider from the service location.

In Step 207, in response to detecting the departure, a departure timestamp is obtained that represents when the location tracking device departs from the service location. In one or more embodiments, a service completion record is generated based on the arrival timestamp and the departure timestamp. In particular, the elapse time of the service visit is determined based on a difference of the arrival timestamp and the departure timestamp. The elapse time is then included in the service completion record.

In Step 208, a payment request is generated and sent to the subscriber computing device or sent to a financial computer server of a financial institution used by the subscriber user and/or service provider. In one or more embodiments, a payment amount is determined based on the service elapse time and a payment term retrieved from the service subscription record based on the identifier of the service provider's location tracking device. Accordingly, the payment amount is included in the payment request.

In Step 209, the payment is completed to pay for the service visit. In one or more embodiments, the payment is initiated by the subscriber user in response to the payment request. For example, the subscriber user may instruct the financial institution to perform a funds transfer from a service subscriber account of the service subscriber to a service provider account of the service provider. In one or more embodiments, the payment is initiated by the service computer server without intervention from the subscriber user. For example, the service computer server may instruct the financial institution based on a pre-authorized payment term to perform a funds transfer from the service subscriber account to the service provider account. Either initiated by the subscriber user or by the service computer server, a payment confirmation is sent to the subscriber computing device and the location tracking device upon the payment completion.

FIGS. 3A, 3B, 3C, 3D, and 3E show an example in accordance with one or more embodiments of the invention. The example may be practiced based on the system (100) and the method flow chart depicted in FIG. 1 and FIG. 2, respectively.

Figure 3A:
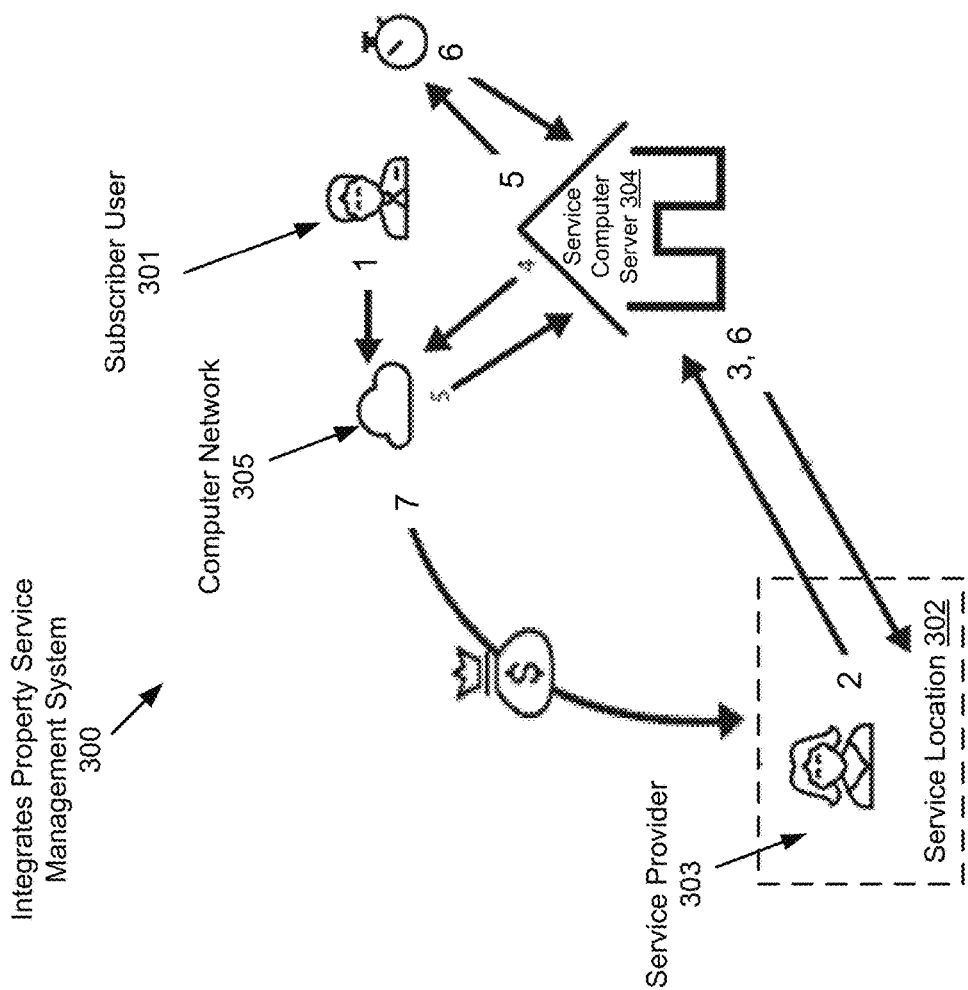
FIGS. 3A, 3B, 3C, 3D, and 3E show an example in accordance with one or more embodiments of the invention.

FIG. 3A shows a schematic diagram of an integrated property service management (IPSM) system (300) used by a subscriber user (301) to track service visits of the service provider (303) to the service location (302). In one or more embodiments, the subscriber user (301), service location (302), service provider (303), service computer server (304), and computer network (305) correspond to like-named components depicted in FIG. 1 above.

In the example shown in FIG. 3A, the IPSM system (300) tracks entry and exit of the service provider (303) to and from the service location (302), alerting the subscriber user (301) of the service visits, and automatically pay the service provider (303). For example, the service location (302) may include a house, an apartment unit, an apartment building, a hotel/motel, an office suite, an office building, a warehouse, a shopping mall, etc. The service provider (303) may include a dog walker, babysitter, maid, gardener, pool cleaner, tutor, music teacher, handyman, auto detailer, in-home care (e.g., elderly-care, child-care) personnel, window washer, house painter, etc. The IPSM system (300) may identify the service provider (303) at the service location (302) based on location information transmitted from a location tracking device carried by the service provider (303), as well as using facial recognition, passcode, fingerprint, retinal scan, Bluetooth detection, etc., performed and/or obtained at the service location (302). The IPSM system (300) may allow the service provider (303) to enter the service location (302) by deactivating a smart lock via a Bluetooth signal, cellular phone signal, or other wired/wireless signals. The IPSM system (300) may be at a remote site separate from the service location (302) and store the service subscription records and service completion records in a cloud data repository via the computer network (305). Alternatively, the IPSM system (300) may reside within the service location (302) and store the service subscription records and service completion records in an internal data repository. For example, the IPSM system (300) and the smart lock may be integrated in a single unit at the service location (302).

In an example scenario shown in FIG. 3A, the subscriber user (301) is a homeowner "Craig Sullivan", the service location (302) is a house owned by the subscriber user (301), and the service provider (302) is a house cleaner "Kara Boone". Accordingly, the IPSM system (300) provides the aforementioned functionalities based on the example steps below.

1) The homeowner sets up service tracking and service payment for the house. In particular, the home owner specifies the service providers and their rates, including the house cleaner among other service providers.

2) When a babysitter enters the house's boundary zone, the house cleaner is recognized by matching location information transmitted by the location tracking device carried by the babysitter to the service subscription record. Optionally, a facial recognition scan data is obtained by a camera at the house and matched to the service subscription record for further confirmation.

3) The house cleaner is granted temporary access to the house by deactivating a smart lock.

4) A subscriber user message is sent via the computer network to the subscriber user notifying the house cleaner service visit. Optionally, the subscriber user message may include a name of the house cleaner and a picture of the house cleaner taken in Step 2) using the camera.

5) The house cleaner is recognized as an hourly worker based on the service subscription record and a timer is started.

6) The babysitter's departure is detected. The temporary access to the house is terminated by re-activating the smart lock and the service time period is obtained from the timer.

7) The payment is sent to the house cleaner based on the rate specified in the service subscription record.

Figure 3B:
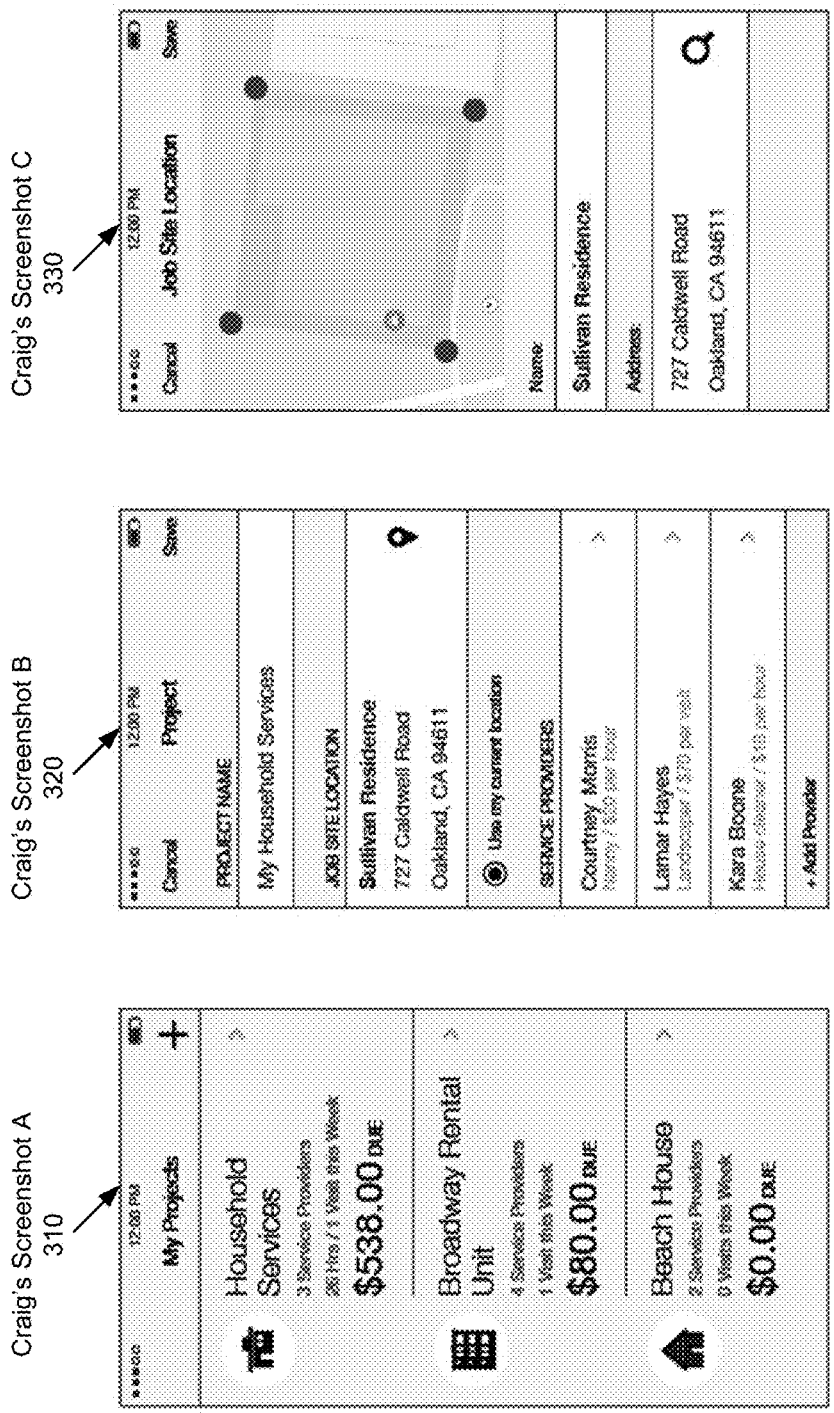
Figure 3C:
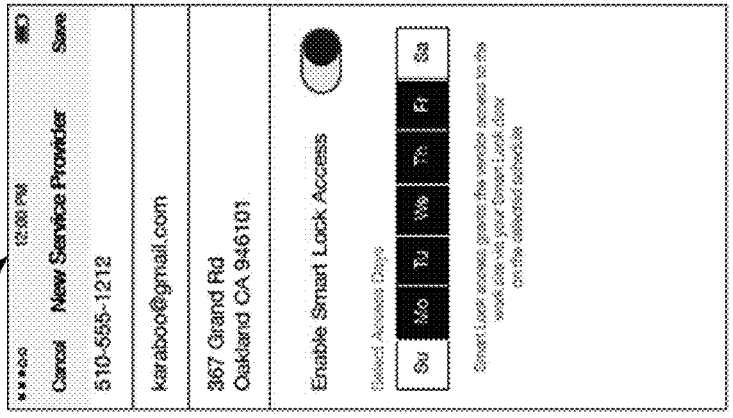
Figure 3C:
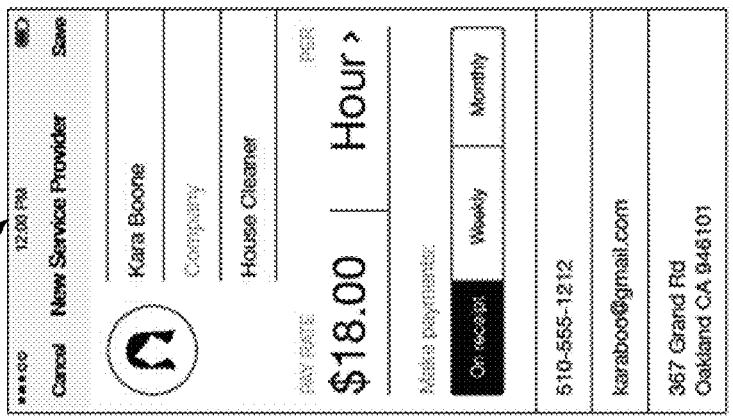
Figure 3D:
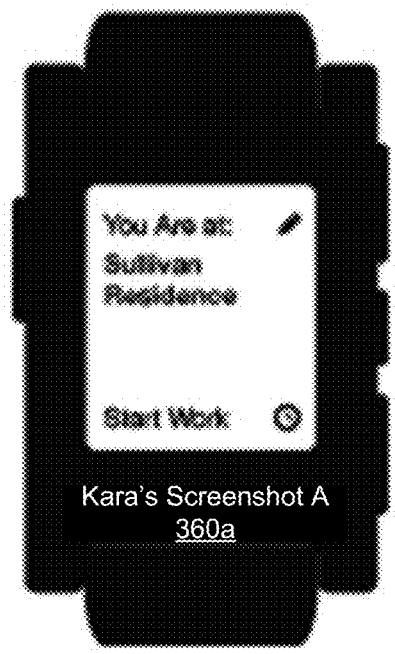
Figure 3D:
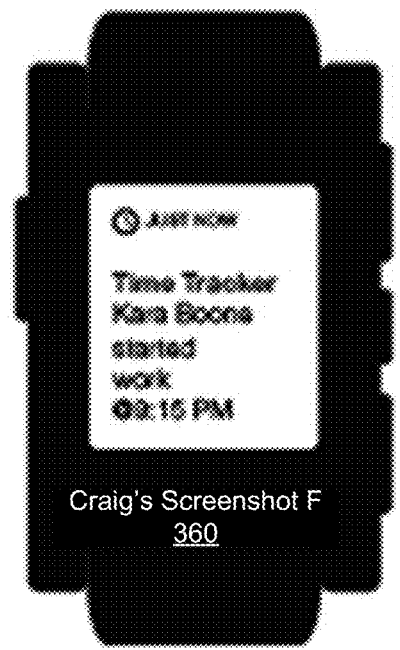
Figure 3D:
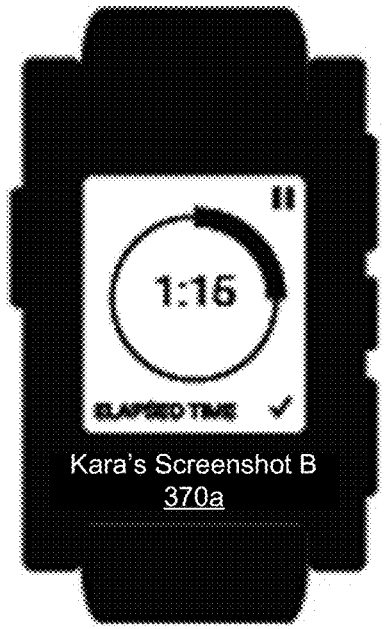
Figure 3D:
Figure 3E:
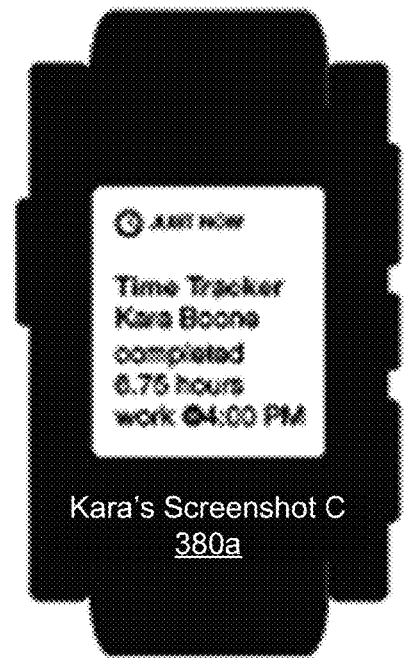
Figure 3E:
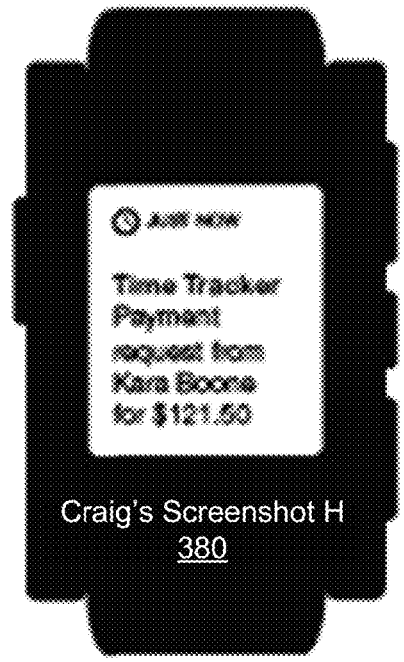
Figure 3E:
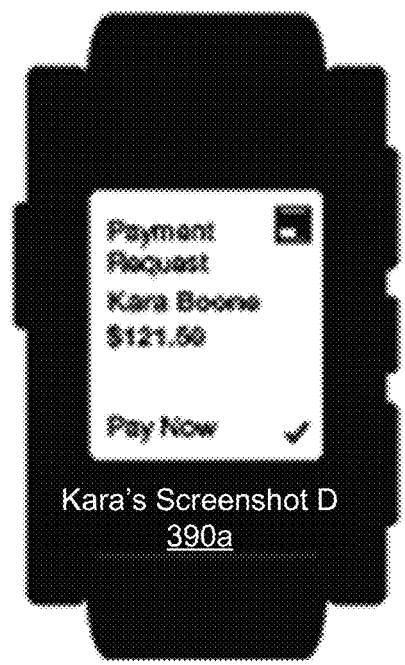
Figure 3E:
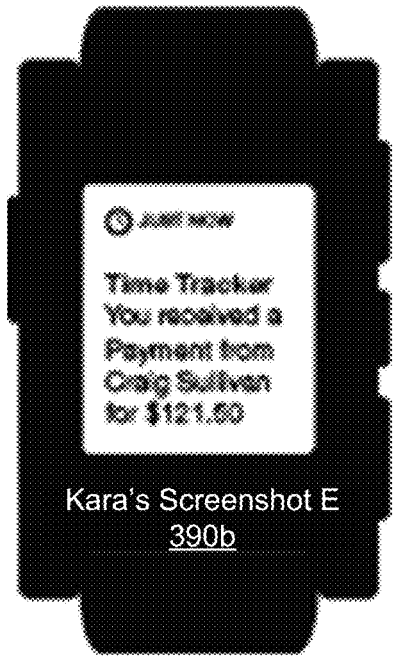

FIGS. 3B, 3C, 3D, and 3E show example screenshots of Craig Sullivan's subscriber computing devices and Kara Boone's location tracking device throughout the example Steps 1) through 7) described above. In particular, FIGS. 3B and 3C show screenshots of a smartphone used by Craig Sullivan when Craig browses the service subscription records for his various service locations. In addition, FIGS. 3D and 3E show screenshots of smartwatches used by Craig Sullivan and Kara Boone during one of Kara's service visits to the house.

FIG. 3B shows Craig's screenshot A (310), Craig's screenshot B (320), and Craig's screenshot C (330). Specifically, Craig's screenshot A (310) shows a list of service locations subscribed for service tracking. For example, the service subscription record for the house is displayed as "Household Services" and shows three registered service providers who collectively worked 26 hours during one visit this week with $538 due in payment. Further, Craig's screenshot B (320) shows location information of the house and the names of three registered service providers. For example, Kara Boone is listed as the house cleaner with $18 per hour rate. Craig's screenshot C (330) shows additional details of the location information including the address and a map.

FIG. 3C shows Craig's screenshot D (340) and Craig's screenshot E (350). Specifically, Craig's screenshot D (340) shows additional details of Kara's information. For example, Kara's payment term, phone number, email address, and mailing address are displayed in Craig's screenshot D (340). In particular, Kara's cellular phone is used as her location tracking device and her cellular phone number 510-555-1212 is used as the tracking device identifier for Kara. Craig's screenshot E (350) shows further details of Kara's information. For example, Kara's service visit schedule and method of entry are displayed in Craig's screenshot D (340) as weekday only and smart lock access.

FIG. 3D shows Kara's screenshot A (360a), Kara's screenshot B (370a), Craig's screenshot F (360), and Craig's screenshot G (370). Specifically, Kara uses a smartwatch as user interface of her cellular phone (i.e., Kara's location tracking device) and Kara's screenshot A (360a) is displayed to Kara when she arrives at Craig's house for a regular service visit. As noted above, Kara's cellular phone number is used as her tracking device identifier. For example, the cellular phone number and GPS information transmitted by Kara's cellular phone is matched to the service subscription record for Craig's house and in turn triggers the service tracking process. Kara starts the service time tracking by clicking the "Start Work" displayed on her smartwatch. As a result, her smartwatch displays Kara's screenshot B (370a) showing a running timer that records the elapse time of Kara's service visit.

At the same time when Kara's screenshot A (360a) and Kara's screenshot B (370a) are displayed to Kara, Craig's smartphone receives subscriber user messages that are displayed as Craig's screenshot F (360) and Craig's screenshot G (370). Specifically, Craig's screenshot F (360) alerts Craig that Kara has arrived the house and started working at 9:15 pm. Craig's screenshot G (370) alerts Craig that Kara completed the service visit and a service completion record is being compiled and sent to Craig.

FIG. 3E shows Kara's screenshot C (380a), Kara's screenshot D (390a), Kara's screenshot E (390b), and Craig's screenshot H (380). Specifically, Kara's screenshot C (380a) shows a service provider message displayed to Kara confirming completion of her service visit at 4:00 pm for a total of 0.75 hours of service. Kara's screenshot D (390a) shows another service provider message displayed to Kara confirming the payment request of $121.50. Kara clicks on the "Pay Now" displayed on Kara's screenshot D (390a) to send the payment request to Craig. As a result, Craig's smartphone receives a corresponding subscriber user message that is displayed as Craig's screenshot H (380). Specifically, Craig's screenshot H (380) alerts Craig that Kara has requested a payment of $121.50. Once Craig's payment is completed, another service provider message is sent to Kara and displayed as Kara's screenshot E (390b) informing Kara that her bank account has received the requested payment.

Figure 4A:
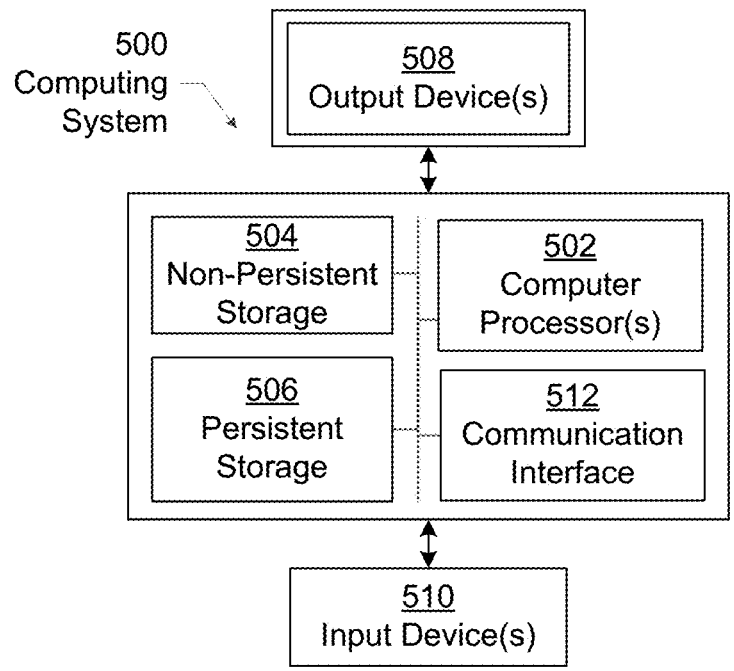
FIGS. 4A and 4B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
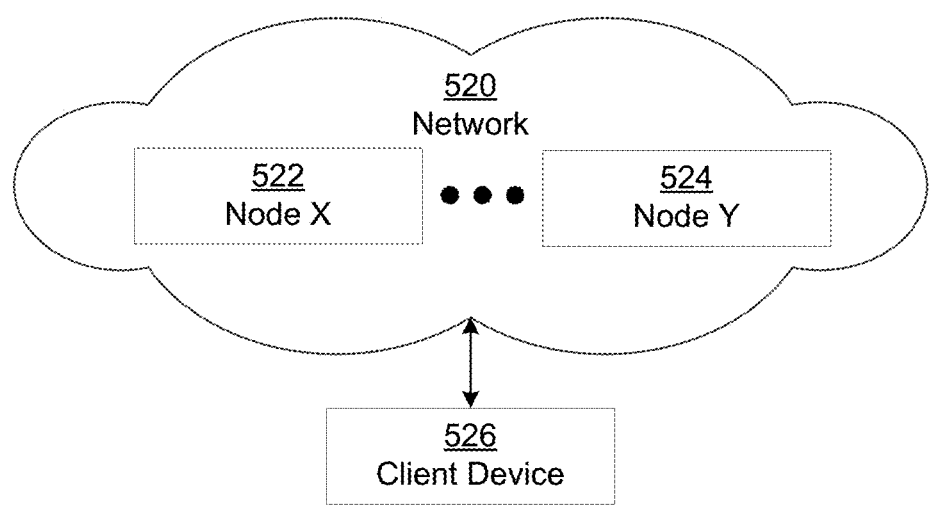

The computing system (500) in FIG. 4A may be connected to or be a part of a network. For example, as shown in FIG. 4B, the network (520) may include multiple nodes (e.g., node X (522), node Y (524)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 4A. Further, the client device (526) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 4A and the nodes and/or client device in FIG. 4B. Other functions may be performed using one or more embodiments of the invention.

What is claimed is:

1. A system comprising:
a location tracking device carried by a service provider;
a security device for controlling access to a pre-determined location; and
a first computer processor and memory storing instructions that, when executed, cause the first computer processor to perform the steps of:
obtaining a pre-determined service subscription record identifying the service provider carrying the location tracking device for performing a pre-determined service at the pre-determined location and at a pre-determined time;
receiving an identifier transmitted by the location tracking device to detect an arrival of the location tracking device to the pre-determined location;
obtaining, in response to detecting the arrival, a first timestamp representing when the location tracking device arrives at the pre-determined location;
generating, in response to detecting the arrival, a match by comparing the identifier and the first timestamp to the pre-determined service subscription record;
deactivating, in response to generating the match and detecting the arrival, the security device to allow the service provider entering the pre-determined location;
detecting, subsequent to generating the match and based on the identifier transmitted by the location tracking device, a departure of the location tracking device from the pre-determined location;
obtaining, in response to detecting the departure, a second timestamp representing when the location tracking device departs from the location; and
generating a service completion record based on the first timestamp and the second timestamp.

2. The system of claim 1, the instructions, when executed, further causing the first computer processor to perform the steps of:
retrieving, from the pre-determined service subscription record and based on the identifier, a name of the service provider; and
sending, in response to detecting the arrival and to a subscriber computing device associated with the pre-determined location, a service subscriber message comprising the name of the service provider and the first timestamp.

3. The system of claim 1, the instructions, when executed, further causing the first computer processor to perform the steps of:
retrieving, from the pre-determined service subscription record and based on the identifier, a payment term;
generating, in response to generating the match and detecting the departure, a payment request based on the service completion record and the payment term, wherein the payment request comprises a payment amount owed by the service subscriber to the service provider; and
sending, to a subscriber computing device, the payment request.

4. The system of claim 1, further comprising:
a second computer processor executing an account management application and configured to:
transfer, based on a payment instruction, a payment from a service subscriber account of the service subscriber to a service provider account of the service provider; and send, in response to transferring the payment and to a service provider mobile device used by the service provider, a payment confirmation, wherein the instructions, when executed, further causing the first computer processor to perform the steps of:
retrieving, from the pre-determined service subscription record and based on the identifier, a payment term identifying the account of the service subscriber for a pre-approved automatic payment; and
sending, to the second computer processor, the payment instruction based on the pre-approved automatic payment and the service completion record, and wherein the first computer processor and the second computer processor are coupled via a computer network.

5. The system of claim 1, the instructions, when executed, further causing the first computer processor to perform the steps of:
receiving, prior to detecting the arrival, a service instruction; and
sending, in response to detecting the arrival and to a service provider mobile device used by the service provider, a service provider message comprising the service instruction,
wherein the service provider mobile device comprises the location tracking device.

6. The system of claim 5, the instructions, when executed, further causing the first computer processor to perform the steps of:
receiving, in response to sending the service instruction and from the service provider mobile device, a service summary; and
sending, in response to receiving the service summary and to a subscriber computing device associated with the pre-determined location, the service summary.

7. The system of claim 1, the instructions, when executed, further causing the first computer processor to perform the steps of:
receiving, prior to detecting the arrival, a request to track the service provider for performing the pre-determined service at the pre-determined location and at the pre-determined time; and
generating, in response to the request, the pre-determined service subscription record.

8. A method of using a location tracking device, comprising:
obtaining a pre-determined service subscription record identifying a service provider carrying the location tracking device for performing a pre-determined service at a pre-determined location and at a pre-determined time;
receiving an identifier transmitted by the location tracking device to detect an arrival of the location tracking device to the pre-determined location;
obtaining, in response to detecting the arrival, a first timestamp representing when the location tracking device arrives at the pre-determined location;
generating, in response to detecting the arrival, a match by comparing the identifier and the first timestamp to the pre-determined service subscription record;
detecting, subsequent to generating the match and based on the identifier transmitted by the location tracking device, a departure of the location tracking device from the pre-determined location;
obtaining, in response to detecting the departure, a second timestamp representing when the location tracking device departs from the location; and
generating a service completion record based on the first timestamp and the second timestamp.

9. The method of claim 8, further comprising:
retrieving, from the pre-determined service subscription record and based on the identifier, a name of the service provider; and
sending, in response to detecting the arrival and to a subscriber computing device associated with the pre-determined location, a service subscriber message comprising the name of the service provider and the first timestamp.

10. The method of claim 8, further comprising:
retrieving, from the pre-determined service subscription record and based on the identifier, a payment term;
generating, in response to generating the match and detecting the departure, a payment request based on the service completion record and the payment term, wherein the payment request comprises a payment amount owed by the service subscriber to the service provider; and
sending, to a subscriber computing device, the payment request.

11. The method of claim 8, further comprising:
retrieving, from the pre-determined service subscription record and based on the identifier, a payment term identifying an account of the service subscriber for a pre-approved automatic payment;
sending a payment instruction based on the pre-approved automatic payment and the service completion record;
transferring, based on the payment instruction, a payment from a service subscriber account of the service subscriber to a service provider account of the service provider; and
sending, in response to transferring the amount and to a service provider mobile device used by the service provider, a payment confirmation.

12. The method of claim 8, further comprising:
receiving, prior to detecting the arrival, a service instruction; and
sending, in response to detecting the arrival and to a service provider mobile device used by the service provider, a service provider message comprising the service instruction,
wherein the service provider mobile device comprises the location tracking device.

13. The method of claim 12, further comprising:
receiving, in response to sending the service instruction and from service provider mobile device, a service summary; and
sending, in response to receiving the service summary and to a subscriber computing device associated with the pre-determined location, the service summary.

14. The method of claim 8, further comprising:
receiving, prior to detecting the arrival, a request to track the service provider for performing the pre-determined service at the pre-determined location and at the pre-determined time;
generating, in response to the request, the pre-determined service subscription record; and
deactivating, in response to generating the match and detecting the arrival, a security device to allow the service provider entering the pre-determined location.

15. A non-transitory computer readable medium storing instructions for using a location tracking device, the instructions, when executed by a computer processor, comprising functionality for:
- obtaining a pre-determined service subscription record identifying a service provider carrying the location tracking device for performing a pre-determined service at a pre-determined location and at a pre-determined time;
- receiving an identifier transmitted by the location tracking device to detect an arrival of the location tracking device to the pre-determined location;
- obtaining, in response to detecting the arrival, a first timestamp representing when the location tracking device arrives at the pre-determined location;
- generating, in response to detecting the arrival, a match by comparing the identifier and the first timestamp to the pre-determined service subscription record;
- detecting, subsequent to generating the match and based on the identifier transmitted by the location tracking device, a departure of the location tracking device from the pre-determined location;
- obtaining, in response to detecting the departure, a second timestamp representing when the location tracking device departs from the location; and
- generating a service completion record based on the first timestamp and the second timestamp.

16. The non-transitory computer readable medium of claim 15, further comprising instructions, when executed by a computer processor, comprising functionality for:
- retrieving, from the pre-determined service subscription record and based on the identifier, a name of the service provider; and
- sending, in response to detecting the arrival and to a subscriber computing device associated with the pre-determined location, a service subscriber message comprising the name of the service provider and the first timestamp.

17. The non-transitory computer readable medium of claim 15, further comprising instructions, when executed by a computer processor, comprising functionality for:
- retrieving, from the pre-determined service subscription record and based on the identifier, a payment term;
- generating, in response to generating the match and detecting the departure, a payment request based on the service completion record and the payment term, wherein the payment request comprises a payment amount owed by the service subscriber to the service provider; and
- sending, to a subscriber computing device, the payment request.

18. The non-transitory computer readable medium of claim 15, further comprising instructions, when executed by a computer processor, comprising functionality for:
- retrieving, from the pre-determined service subscription record and based on the identifier, a payment term identifying an account of the service subscriber for a pre-approved automatic payment;
- sending a payment instruction based on the pre-approved automatic payment and the service completion record;
- transferring, based on the payment instruction, a payment from a service subscriber account of the service subscriber to a service provider account of the service provider; and
- sending, in response to transferring the amount and to a service provider mobile device used by the service provider, a payment confirmation.

19. The non-transitory computer readable medium of claim 15, further comprising instructions, when executed by a computer processor, comprising functionality for:
- receiving, prior to detecting the arrival, a service instruction; and
- sending, in response to detecting the arrival and to a service provider mobile device used by the service provider, a service provider message comprising the service instruction,
- wherein the service provider mobile device comprises the location tracking device.

20. The non-transitory computer readable medium of claim 19, further comprising instructions, when executed by a computer processor, comprising functionality for:
- receiving, in response to sending the service instruction and from service provider mobile device, a service summary; and
- sending, in response to receiving the service summary and to a subscriber computing device associated with the pre-determined location, the service summary.

21. The non-transitory computer readable medium of claim 15, further comprising instructions, when executed by a computer processor, comprising functionality for:
- receiving, prior to detecting the arrival, a request to track the service provider for performing the pre-determined service at the pre-determined location and at the pre-determined time;
- generating, in response to the request, the pre-determined service subscription record; and
- deactivating, in response to generating the match and detecting the arrival, a security device to allow the service provider entering the pre-determined location.

* * * * *